United States Patent [19]

Tsuzawa

[11] Patent Number: 6,018,382
[45] Date of Patent: Jan. 25, 2000

[54] PHOTO PRINTER AND PAPER MASK DEVICE

[75] Inventor: Yoshiyuki Tsuzawa, Kanagawa, Japan

[73] Assignee: Fuji Photo Film Co., Ltd., Kanagawa, Japan

[21] Appl. No.: 08/896,950

[22] Filed: Jul. 18, 1997

[30] Foreign Application Priority Data

Jul. 19, 1996 [JP] Japan ..................................... 8-190214
Jul. 19, 1996 [JP] Japan ..................................... 8-190215

[51] Int. Cl.[7] ........................... G03B 27/52; G03B 27/58
[52] U.S. Cl. ................................................. 355/40; 355/74
[58] Field of Search ............................... 355/74, 54, 40, 355/27, 407, 408

[56] References Cited

U.S. PATENT DOCUMENTS

| | | | |
|---|---|---|---|
| 4,766,492 | 8/1988 | Miyawaki | 355/125 |
| 4,857,962 | 8/1989 | Satou | 355/29 |
| 4,965,662 | 10/1990 | Shiota | 358/78 |
| 5,055,941 | 10/1991 | Sukuki et al. | 358/450 |
| 5,365,308 | 11/1994 | Ozawa et al. | 355/74 |
| 5,442,419 | 8/1995 | Masutani | 355/74 |
| 5,734,461 | 3/1998 | Ishikawa et al. | 355/74 |

*Primary Examiner*—David M. Gray
*Assistant Examiner*—Hung Henry Nguyen
*Attorney, Agent, or Firm*—Sughrue, Mion, Zinn, MacPeak & Seas, PLLC

[57] ABSTRACT

A paper mask device can alternatively hold a first paper mask or a second paper mask. The first paper mask has a mask aperture to which a lith film with appropriate lettering is attached. The second paper mask has a mask aperture for making an index print composed of a plurality of index frames. The paper mask device can hold a lamp box for illuminating the lith film when the first paper mask is held in the paper mask device. The paper mask device holds the paper mask so as to be pivotal about an axis that is disposed in a center of a leading end of the paper mask in the mask inserting direction, so that inclination of the mask aperture is adjustable through a positioning device which holds opposite side edges of a trailing end portion of the paper mask in the masking position.

14 Claims, 12 Drawing Sheets

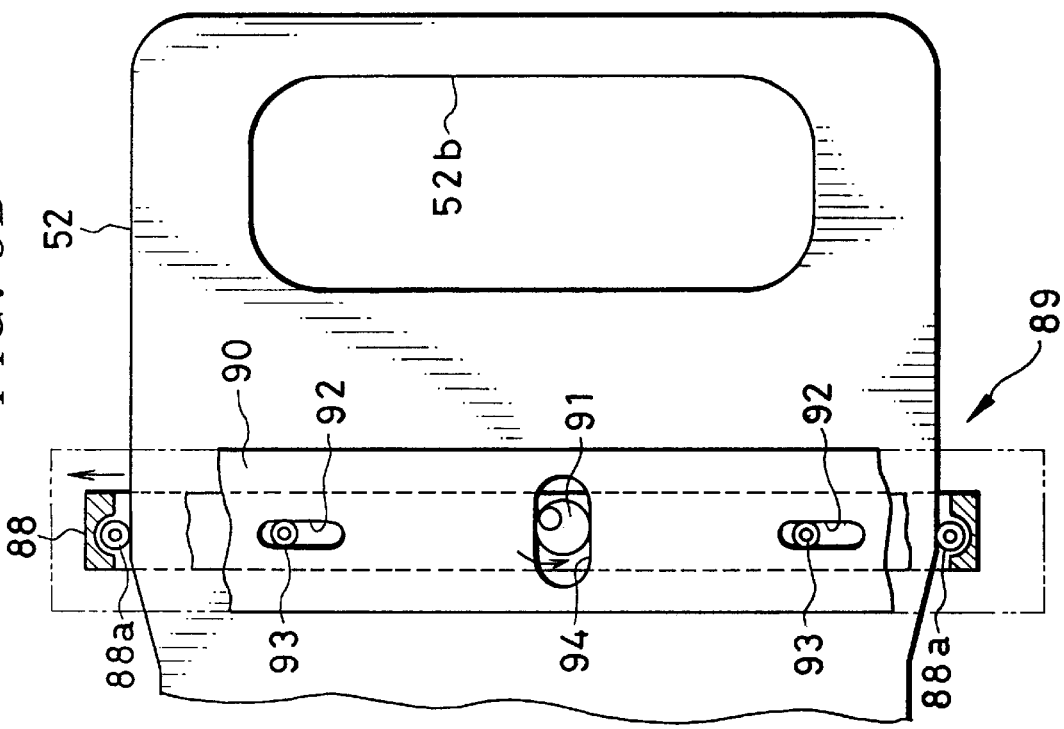
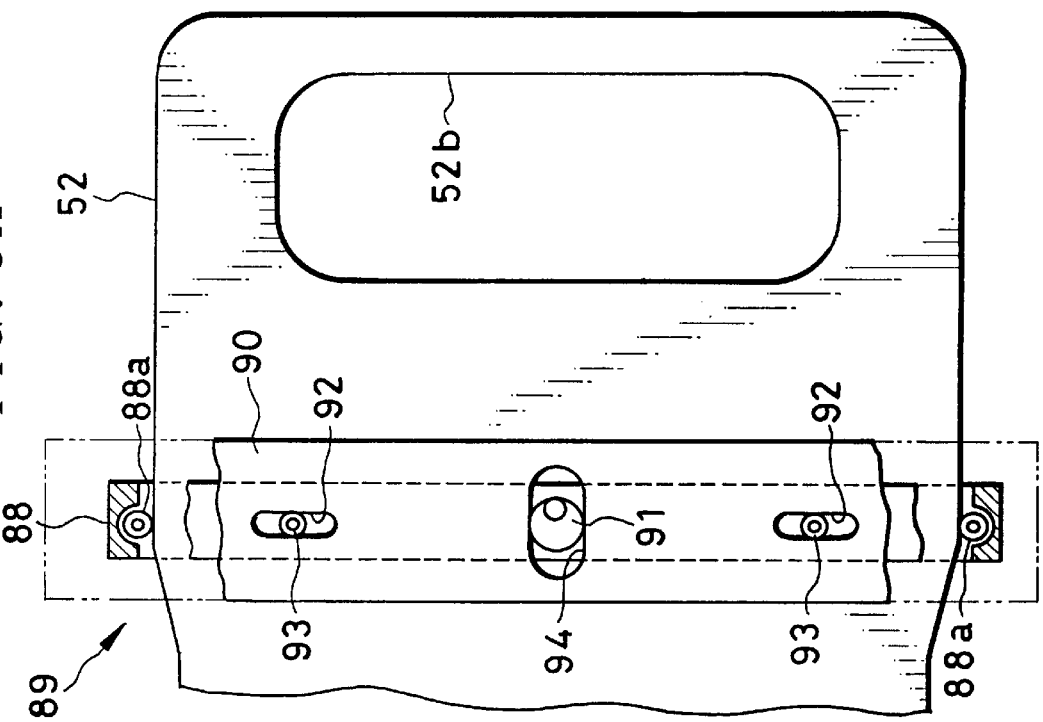

PHOTO PRINTER AND PAPER MASK DEVICE

BACKGROUND OF THE INVENTION

1. Field of the Invention

The present invention relates to a photo printer and a paper mask device for use in the photo printer. Particularly, the present invention relates to a photo printer which can make an index print that shows all frames recorded on one filmstrip, and also to a paper mask device suitable for the index print. The present invention further relates to a photo printer having a subsidiary printing station which may be used either for index-printing or for merge-printing lettering with a pictorial image in a photo print, in addition to a main printing station for printing the pictorial image from a frame on photo film. The present invention relates also to a paper mask device suitable for the subsidiary printing station.

2. Background Arts

Recently, the index print showing all frames of a filmstrip in a row or in a matrix has also been widely known. The index print is made by scanning image data from the frames, displaying composed images of these frames based on the image data on a display screen, e.g. a liquid crystal display (LED) panel, and exposing photographic paper to the composed images through a printing lens. The individual frames in the index print are quite smaller than the ordinary photographs, that is, equal to or smaller than the original frames on the photo film. Hereinafter the frames of the index print will be referred to as index frames.

If all the index frames of one filmstrip should be printed at one time, a large scale display screen or a LED with a large number of pixels would be necessary. The large scale display screen enlarges the photo printer, and the LED with high pixel density is expensive. Therefore, it is conventional to display a limited number of frames, e.g. five frames, as a composed image, and record the limited number of index frames in a line at one time after advancing the photo paper by one step. In this way, an index print is produced as a series of index frames or as a frame matrix, e.g. a matrix of 5×5 index frames. For the index-printing, a specific paper mask is used for defining an exposure area for the index frames of one line printed at one time.

FIG. 14 shows an example of index-printing wherein five index frames are printed in a column at one time, and wherein an exposed area 2 of photo paper 3 through an aperture of the paper mask is shown by a solid line. If the paper mask is crooked, index frames 4 are printed at a tilt, for example as shown in FIG. 14, wherein phantom lines show a correct position on the photo paper 3. As the index frames are small, even a slight tilt is conspicuous especially where the index frames are arranged in a matrix. Accordingly, positioning of the paper mask is important for index-printing.

Meanwhile, to produce a post card or a greeting card by merge-printing lettering with a photograph is getting popular these days. The lettering may be merged in a separate location from a pictorial image or the photograph within the card, or may be superimposed on the photograph.

Accordingly, it is desirable to provide a photo printer that can carry out both merge-printing and index-printing besides the ordinary photograph printing. However, providing a printing station for the merge-printing and a printing station for the index-printing in addition to a main ordinary printing station results in a large scale photo printer.

SUMMARY OF THE INVENTION

In view of the foregoing, an object of the present invention is to provide a photo printer having a subsidiary printing station which may be used either for making the index print or for merge-printing characters in a photograph, besides a main printing station for making the photograph from a frame of photo film.

Another object of the present invention is to provide a paper mask device suitable for the subsidiary printing station A further object of the present invention is to provide a paper mask device which can position a paper mask with accuracy without the need for complicated construction and operation.

To achieve the above and other objects, a paper mask device according to the present invention is provided with a mask guiding and holding means which can alternatively hold a first paper mask or a second paper mask. The first paper mask has a mask aperture to which a lith film with appropriate lettering is attached. The second paper mask has a mask aperture for making an index print composed of a plurality of index frames. The paper mask device has a lamp box guiding and holding means which can hold a lamp box in an illuminating position for illuminating the lith film when the first paper mask is held in the paper mask device.

According to a photo printer of the present invention, a paper feeding means feeds a web of photo paper from a roll through a paper transport path to a main printing station for printing an image on the photo paper from one original frame recorded on photo film. A subsidiary printing station is disposed before or behind the main printing station in the paper transport path. In the subsidiary printing station are disposed the paper mask device as above and an index image exposure means for projecting a composed image of the index frames onto the photo paper through the mask aperture of the second paper mask. The composed image exposure means is allowed to project the index image while the lamp box is retracted from the illuminating position.

According to the present invention, a paper mask device which can adjust the position of the paper mask is provided with a mask guiding member for guiding a paper mask into or out of a masking position for masking photo paper; a pivot member formed at a center of a leading end of the paper mask in a mask inserting direction into the masking position; a bearing member formed in the mask guiding member for bearing the pivot member of the paper mask to be pivotal thereon in a plane horizontal to the paper mask in the masking position; and a mask shifting means holding a trailing end portion of the paper mask in the masking position and shifting the paper mask so as to pivot about the pivot member.

BRIEF DESCRIPTION OF THE DRAWINGS

The above and other objects and advantages of the present invention will become apparent from the following detailed description of the preferred embodiments when read in connection with the accompanying drawings, which are given by way of illustration only and thus are not limitative of the present invention, wherein like reference numerals designate like or corresponding parts throughout the several views, and wherein:

FIGS. 8A and 8B are fragmentary views of a mask positioning mechanism of the paper mask device in a neutral position and a corrected position, respectively;

DETAILED DESCRIPTION OF THE PREFERRED EMBODIMENTS

Figure 1:
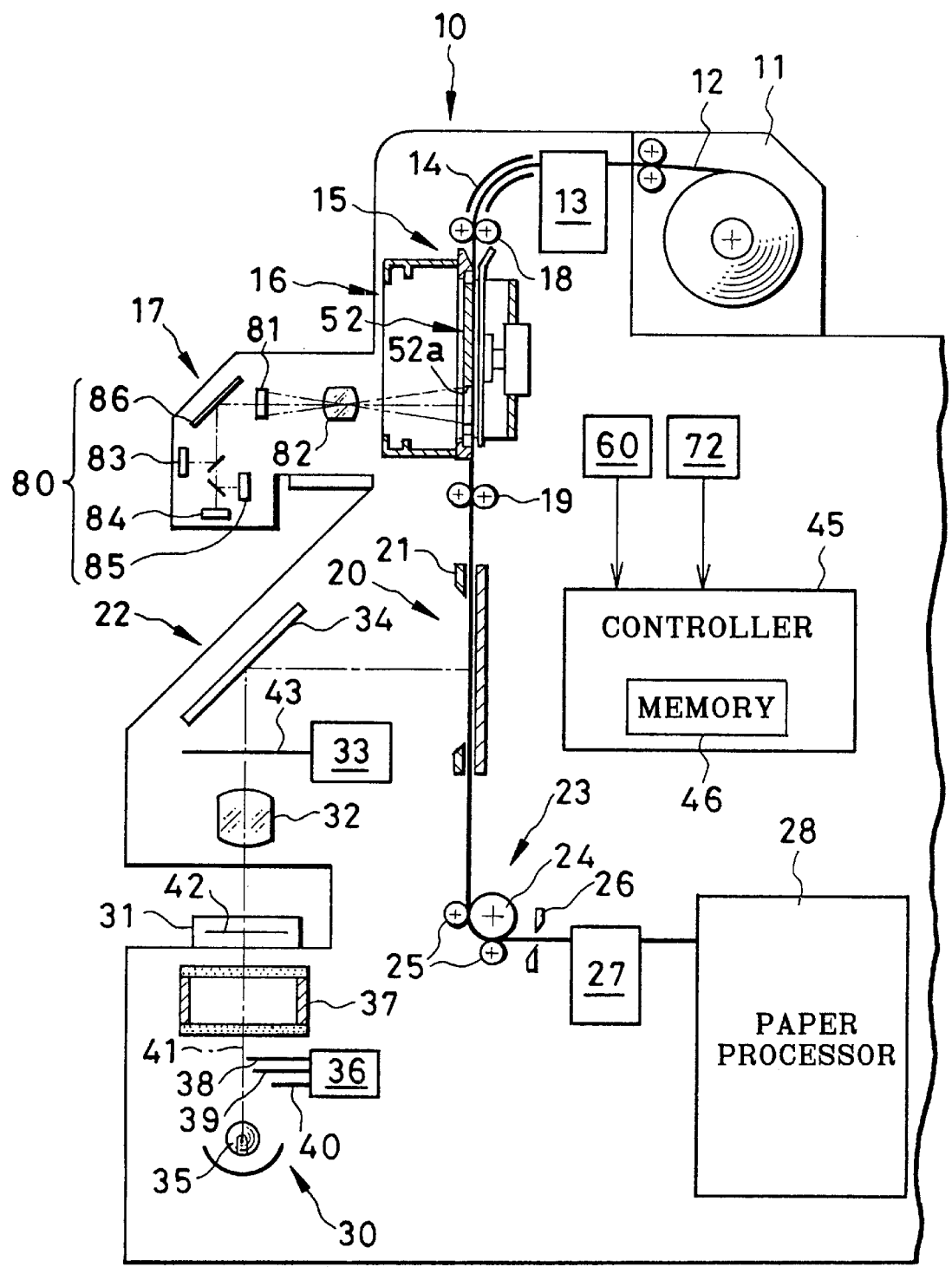
FIG. 1 is a schematic diagram illustrating the overall construction of a photo printer-processor according to an embodiment of the present invention.

In FIG. 1, a printer-processor 10 is loaded with a paper magazine 11, from which a photo paper 12 is fed through a first paper reservoir 13 and a paper guide 14 out to a subsidiary printing station 15 and then to a main printing station 20.

A paper mask device 16 and an index image exposure section 17 are disposed in the subsidiary printing station 15. A paper mask device 21 and a main exposure section 22 are disposed in the main printing station 20. The paper mask device 21 in the main printing station 20 may be a conventional device which can change the size of mask aperture in accordance with the print format.

A feed roller device 23 consisting of a drive roller 24 and nip rollers 25 is disposed behind the main printing station 20. The feed roller device 23 feeds the photo paper 12 sequentially frame by frame to the printing stations 15 and 20, or feeds the photo paper 12 step by step corresponding to one column of an index print to the subsidiary printing station 20 when to make the index print. Two pairs of paper feed rollers 18 and 19 are disposed near the exits of the respective printing stations 15 and 20, and are driven synchronously with the drive roller 24 to feed the photo paper 12 at the same speed. It is possible to omit these paper feed rollers 18 and 19.

A paper cutter 26 and a second paper reservoir 27 are disposed behind the feed roller device 23. The paper cutter 26 cuts the photo paper 12 into a certain length containing a series of exposed pictures. The cut portion of the photo paper 12 is processed in a paper processor 28 for developing.

The main exposure section 22 is constituted of a light source 30, a film carrier 31, a printing lens 32, a shutter driver 33 and a mirror 34, as well known in the art. The light source 30 has a white lamp 35, a light controller 36 and a diffusion box 37. The light controller 36 controls the quality and intensity of printing light by adjusting insertion amounts of three color filters 38, 39 and 40 into a printing light path 41. The diffusion box 37 diffuses and equalizes the light controlled by the light controller 36, and projects it toward an original frame on photo filmstrip 42 that is placed in the film carrier 31. The film carrier 31 automatically positions the original frame one after another in a printing position.

The printing light traveling through the original frame is focused through the printing lens 32 and the mirror 34 onto the photo paper 12 positioned in the main printing station 20, while a shutter 43 is opened by the shutter driver 33. It is to be noted that a not-shown film scanner is disposed in face of the original frame to print, so as to measure three color separation densities of each pixel of the original frame. The measured densities are used to determine three color exposure amounts. The light controller 36 controls the filters 38 to 40 based on the exposure amounts. The measured densities are also processed into image data, and the image data is stored in a memory 46 of a controller 45. The controller 45 composes a video image from the image data of each original frame. The scanning may be carried out at each frame printing. Alternatively, it is possible to scan all original frames on one filmstrip 42 while feeding the filmstrip 42 in a direction through the film carrier 31, and print these frames successively while feeding the filmstrip 42 in the opposite direction through the film carrier 31. It is also possible to transport the filmstrip 42 two rounds through the film carrier 31, one round for the scanning and the other for the printing.

Figure 2:
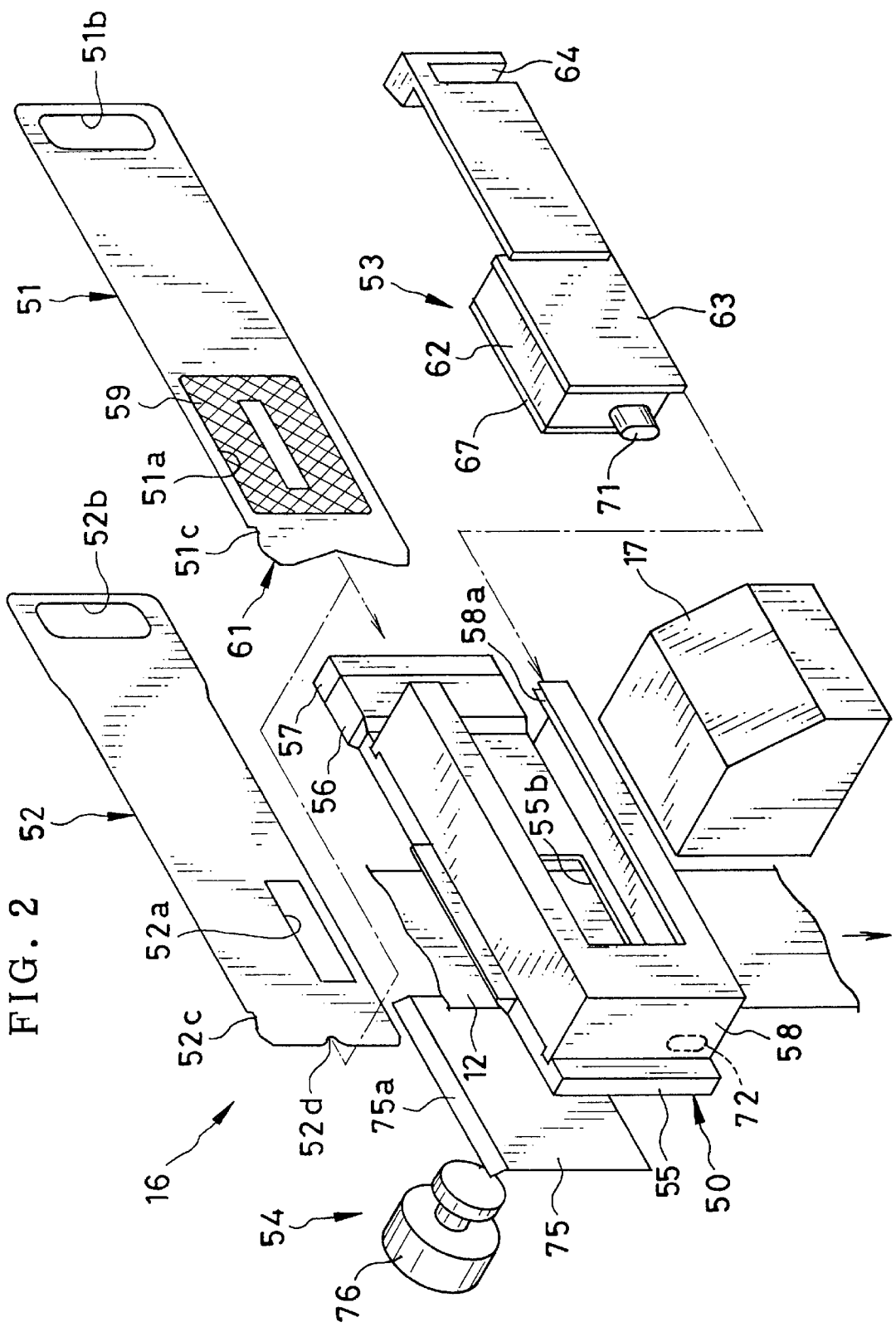
FIG. 2 is an exploded perspective view of a paper mask device used in a subsidiary printing station of the photo printer-processor according to the embodiment of FIG. 1.

As shown in FIG. 2, the paper mask device 16 consists of a housing 50, first and second paper masks 51 and 52, a lamp box 53 and a paper presser 54. The housing 50 is constituted of a mask guide plate 55, a light shielding portion 56, a mask positioning mechanism 57 and a lamp box guide frame 58.

Figure 3:
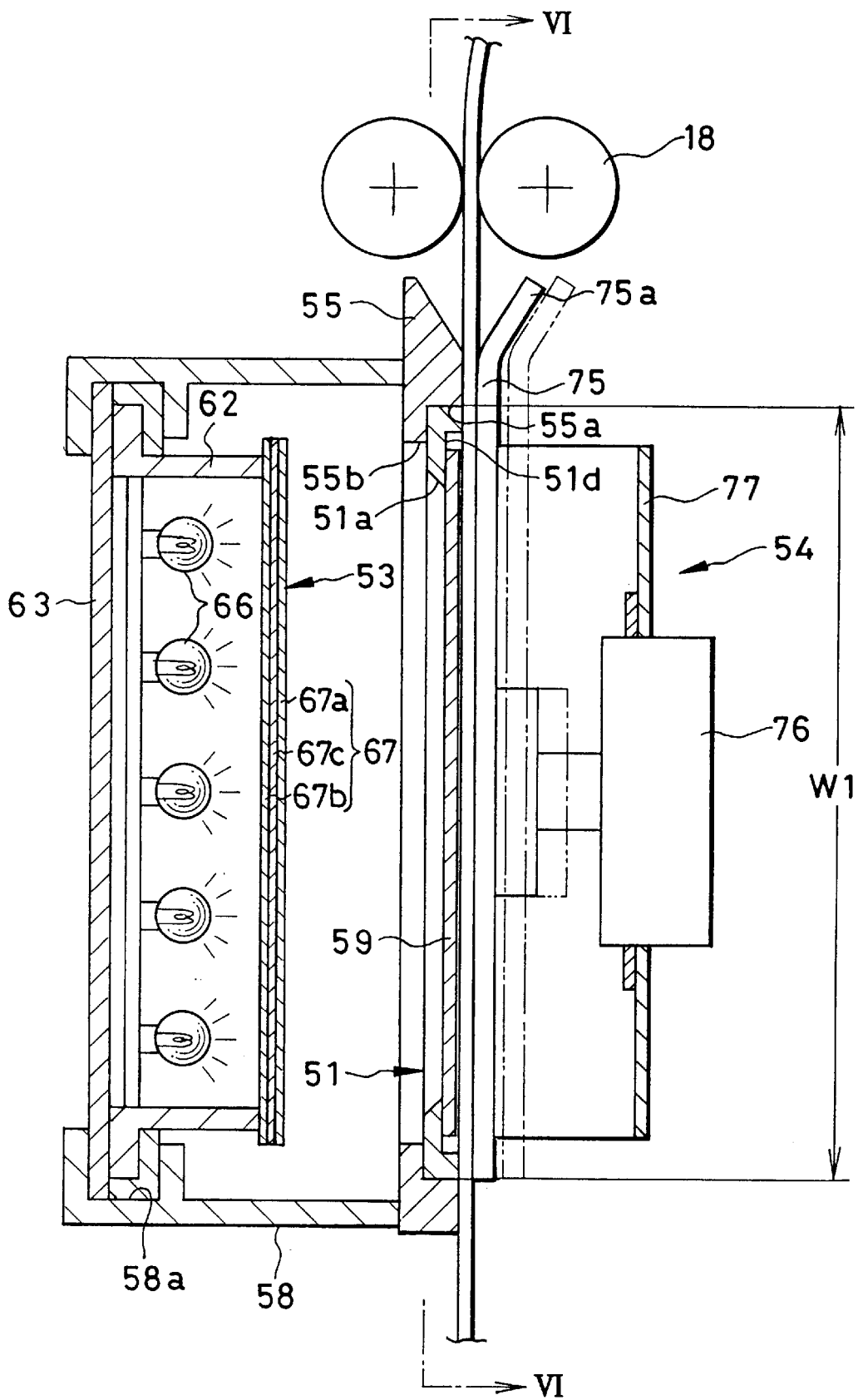
FIG. 3 is a sectional view of the paper mask device of FIG. 2, in a position for merge-printing.
Figure 4:
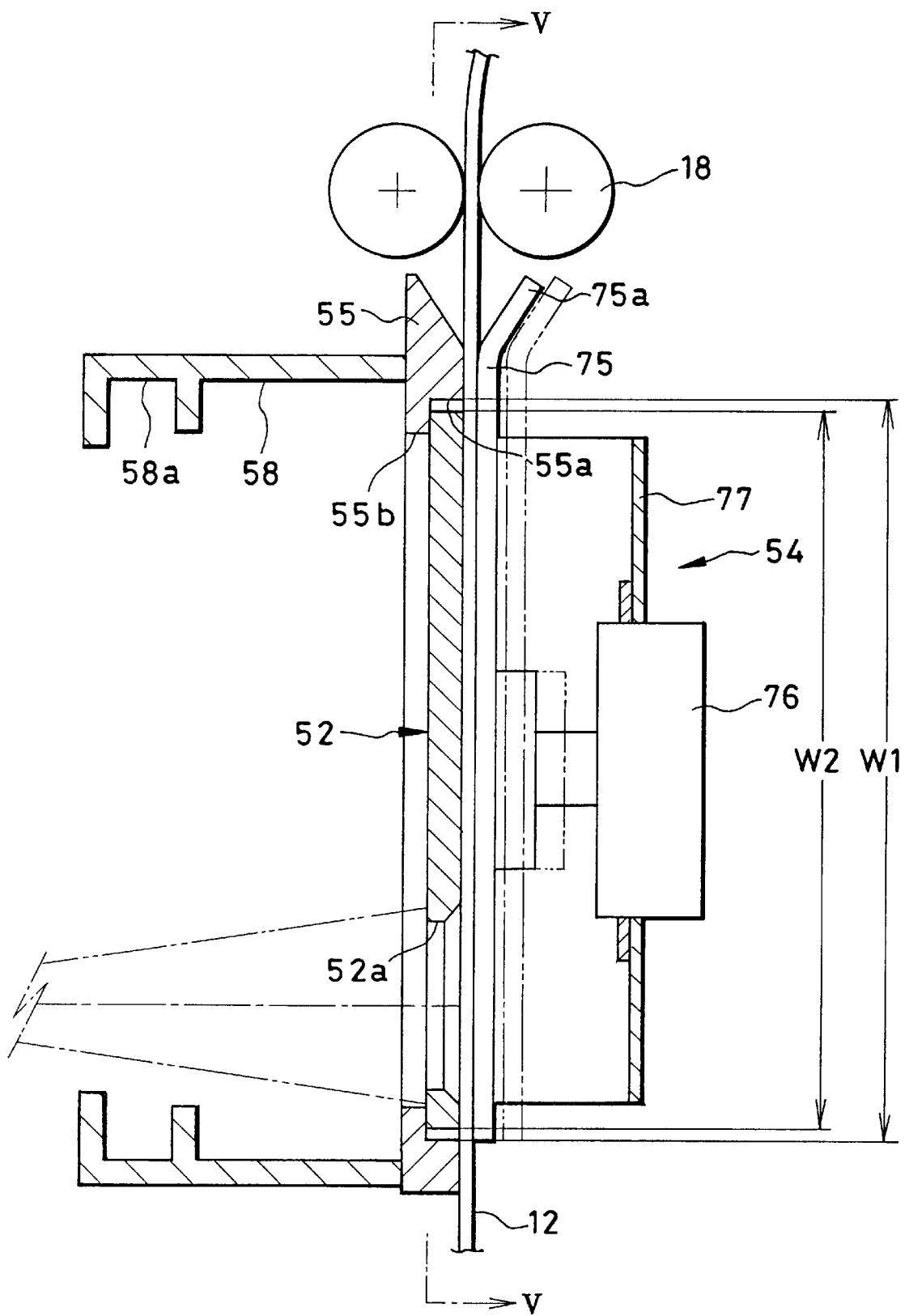
FIG. 4 is a sectional view of the paper mask device of FIG. 2, in a position for index-printing.

As shown in FIGS. 3 and 4, the mask guide plate 55 has an opening 55b in front of the subsidiary printing station 15, and has guide grooves 55a for sliding either one of the paper masks 51 and 52 into and out of a masking position where a mask aperture 51a or 52a of the paper mask 51 or 52 is placed in the opening 55b. The first paper mask 51 has a width approximately equal to an internal width W1 of the mask guide plate 55, i.e. a distance between opposite bottoms of the guide grooves 55a. Therefore, the first paper mask 51 is positioned properly only by sliding it into the guide grooves 55a. As shown in FIG. 4, the second paper mask 52 has a width W2 that is less than the internal width W1 of the mask guide plate 55, so that the position of the second paper mask 52 can be adjusted inside the mask guide plate 55, as will be described in more detail later.

As shown in FIGS. 1 and 3, the first paper mask 51 has a lith film attaching recess 51d around the mask aperture 51a. The lith film attaching recess 51d has a depth slightly more than a thickness of a lith film 59, so that the lith film 59 may not directly contact the photo paper 12. The first paper mask 51 of this embodiment is used for superimposing characters on the photograph, e.g. for producing greeting cards. The mask aperture 52a of the second paper mask 52 is directed to framing five index frames in a column to print an index frame matrix.

The paper masks 51 and 52 also have gripping openings 51b and 52b and locking notches 51c and 52c, respectively. The gripping opening 51b or 52b permit gripping the paper masks 51 or 52 to slide it into or out of the guide grooves 55a. If the paper mask 51 or 52 is inserted into the guide grooves 55a upside down, the locking notch 51c or 52c gets into engagement with a not shown locking member provided in the guide grooves 55a, to stop insertion of the paper mask 51 or 52 into the masking position. It is possible to provide a latching member that gets into engagement with the locking notch 51c or 52c when the paper mask 51 or 52 is properly inserted into the masking position, so as to prevent accidental retraction of the paper mask 51 or 52 from the masking position.

Figure 5:
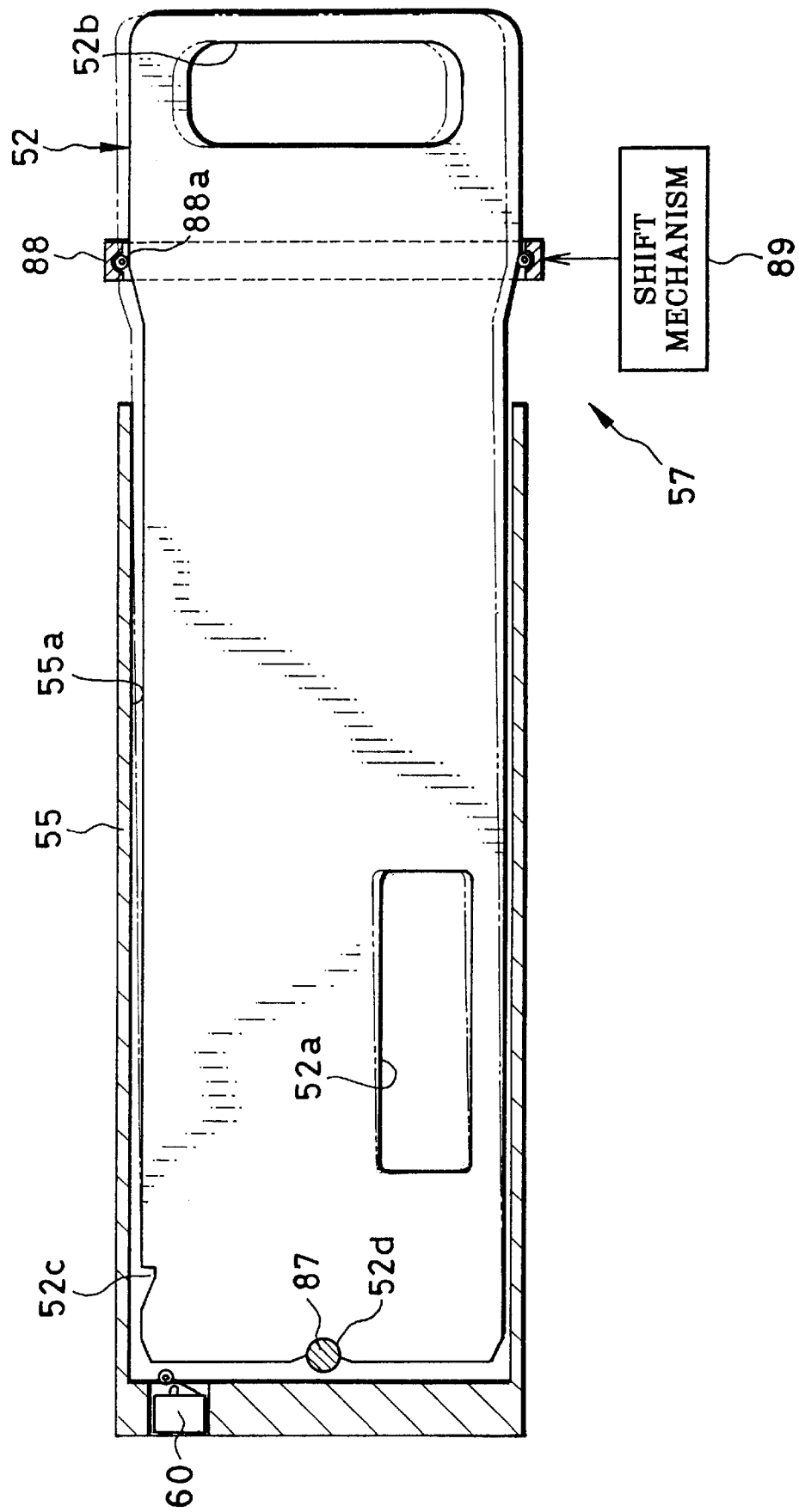
FIG. 5 is a sectional view of the paper mask device in the index-printing position, taken along a line V—V of FIG. 4.
Figure 6:
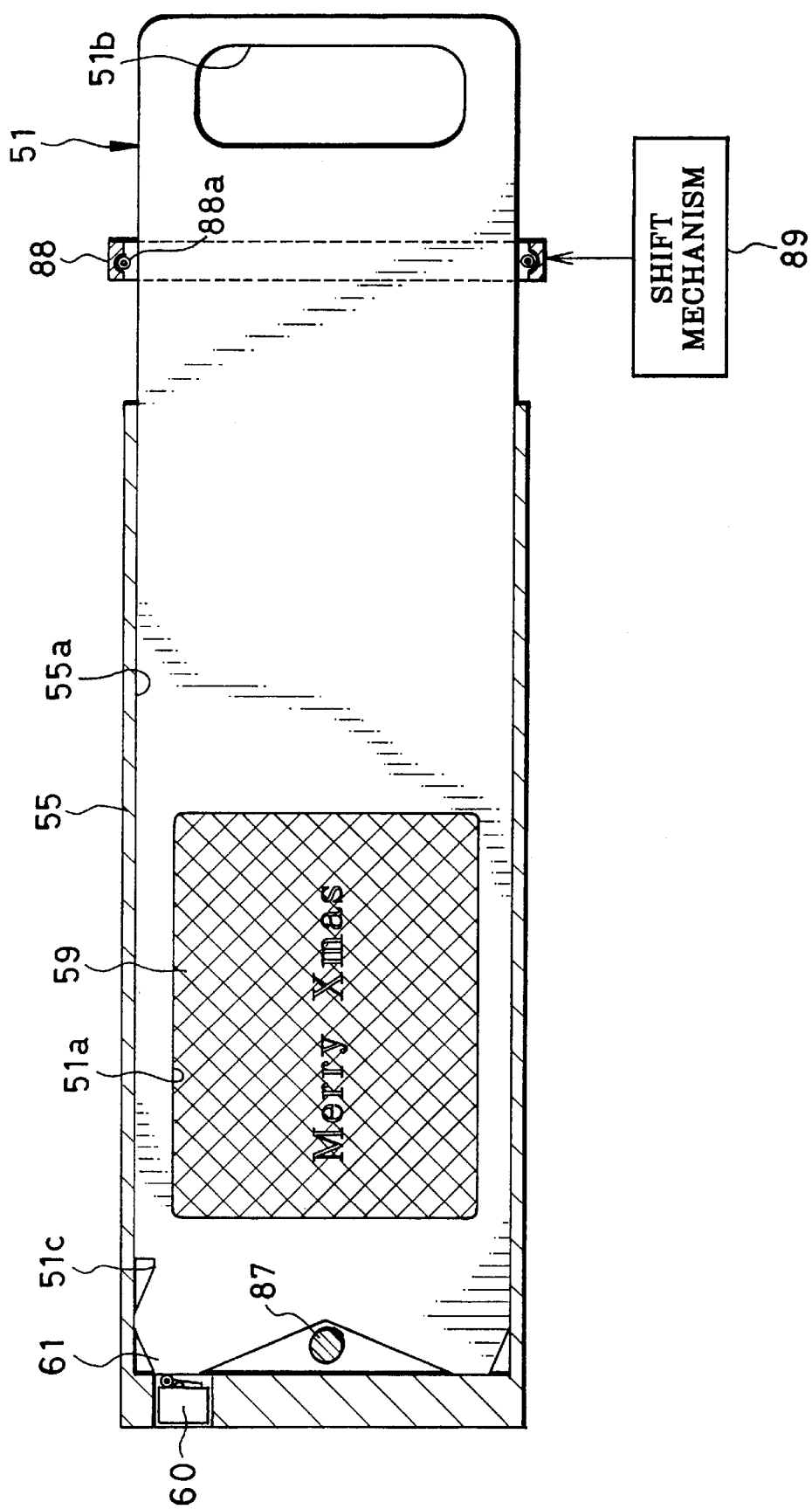
FIG. 6 is a sectional view of the paper mask device in the merge-printing position, taken along a line VI—VI of FIG. 3.

As shown in FIGS. 5 and 6, the mask guide plate 55 is provided with a mask type sensor 60. The mask type sensor 60 is a micro switch which is turned on by a protrusion 61 formed as an identification member at a leading end of the first paper mask 51 when the first paper mask 51 is fully inserted into the masking position. The second paper mask 52 does not have any protrusion at its leading end, so that the micro switch or mask type sensor 60 will not be turned on when the second paper mask 52 is fully inserted into the masking position. The mask type sensor 60 sends a detection signal to the controller 45, so the controller 45 determines which paper mask 51 or 52 is positioned in the paper mask device 16. The mask type sensor 60 may be a photo-electric sensor instead of the micro switch. It is possible to provide a bar code on each paper mask 51 or 52, and a bar code sensor in the paper mask device 16.

The light shielding portion 56 consists of a pair of not-shown light shielding members which are urged by a spring force to be in tight contact with each other, so that the paper mask 51 or 52 must thrust through the light shielding portion 56 into the guide grooves 55a. That is, the paper mask 51 or 52 is nipped between the light shielding members. In this way, the light shielding portion 56 shields ambient light from the interior of the paper mask device 16.

As shown in FIG. 3, the mask guide plate 55 is attached to the lamp box guide frame 58, which has guide grooves 58a for sliding the lamp box 53 into and out of the subsidiary printing station 15. As shown in FIG. 2, the lamp box 53 is constituted of a box housing 62, a base plate 63, a handle 64, a plurality of lamps 66 arranged in a matrix in the box housing 62, and a diffusion plate 67. The diffusion plate 67 consists of a pair of opalescent plates 67a and 67b and an ND filter 67c disposed in between the plates 67a and 67b. Through the diffusion plate 67, the light from the lamps 66 uniformly illuminates the lith film 59. The ND filter 67c controls the quantity of illumination light. It is possible to use a color filter in place of or in addition to the ND filter 67c for merge-printing characters in a particular color.

A connector 71 is provided at a bottom end portion of the box housing 62. The connector 71 is connected to a connector 72 provided in the lamp box guide frame 58 when the lamp box 53 is inserted fully into the lamp box guide frame 58. In this position, power is supplied from a power source of the printer-processor to the lamps 66, which then illuminate the lith film 59.

As shown in FIG. 3, the paper presser 54 is constituted of a paper pressing plate 75, a solenoid 76, and a holding frame 77. The paper pressing plate 75 has an upper edge 75a bent or inclined so as to guide the leading end of the photo paper 12 into the paper mask device 16, in combination with a tapered upper edge of the mask guide plate 55. While the photo paper 12 is transported, the solenoid 76 moves the paper pressing plate 75 to a retracted position as shown by phantom lines in FIG. 3 or 4. On printing, the solenoid 76 moves the paper pressing plate 75 toward the paper mask 51 or 52 to press the photo paper 12 onto the mask guide plate 55.

As shown in FIG. 1, the index image exposure section 17 is constituted of a light source section 80, an LCD panel 81 and a printing lens 82. The light source section 80 consists of red, green and blue LEDs 83, 84 and 85 and a mirror 86. The light from the light source section 80 travels through the LED panel 81 and is focused through the printing lens 82 onto the photo emulsion surface of the photo paper 12. Thus, a column of index frames are printed in an exposure range positioned behind the mask aperture 52a.

After each exposure of one column, the photo paper 12 is advanced by one step corresponding to the length of one column or one exposure range in the paper transporting direction, and the next column of index frames are printed in the next exposure range positioned behind the mask aperture 52a. In this way, an index print is produced from a series of frames recorded on one filmstrip 42.

Figure 7:
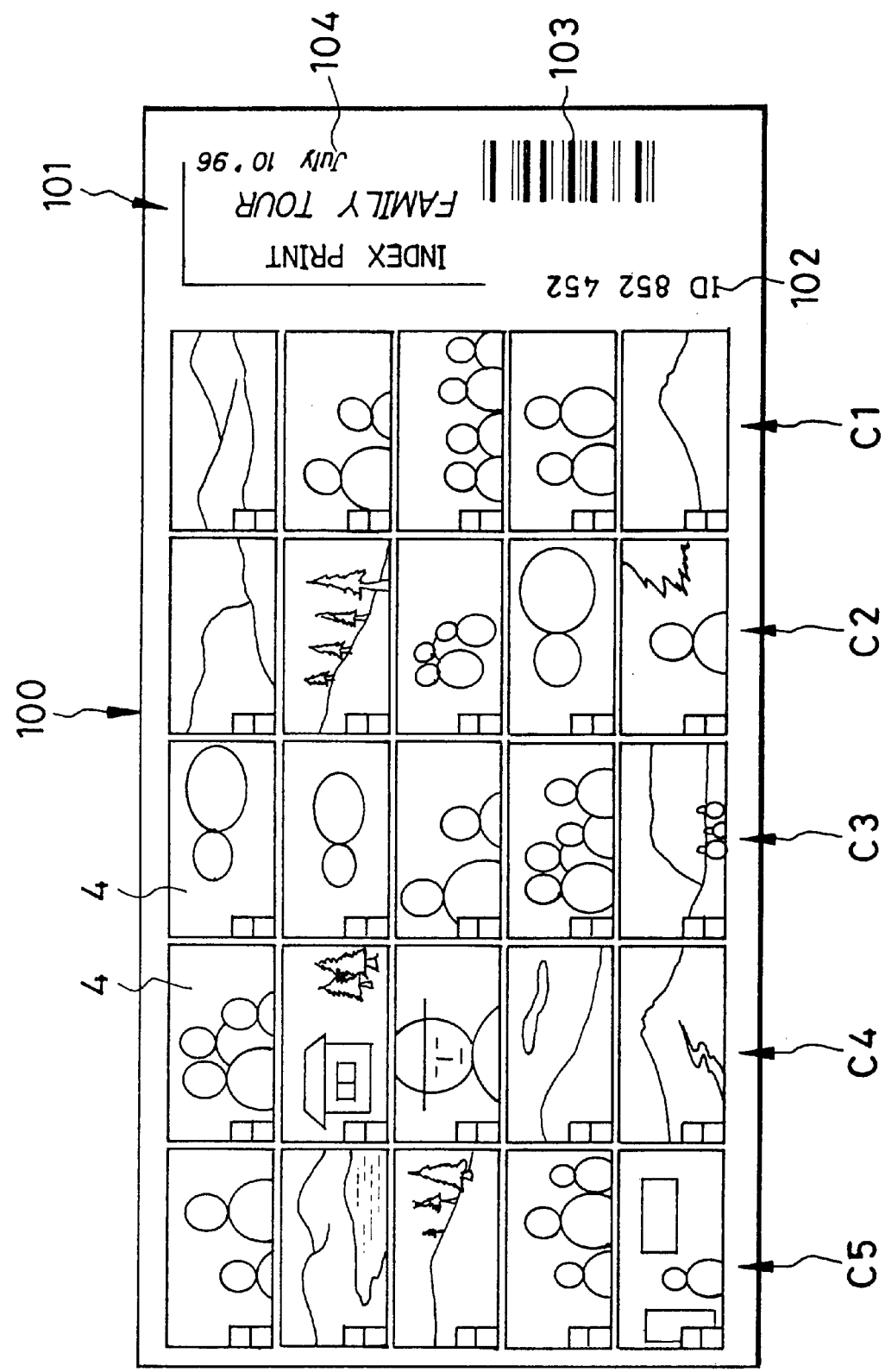
FIG. 7 is a plan view of an example of index print.

FIG. 7 shows an example of consequent index print 100 which contains 5×5 index frames 4. As shown, the index print 100 has a data column 101 besides the index frames 4, in which an ID number 102 of the original filmstrip 42, a bar code 103 of the ID number 102, and a title 104 of the index print 100 are printed. After printing in the data column 101, the index frames 4 are printed one column after another. For example, the first column C1 consists of those index frames numbered "1", "6", "11", "16" and "21" in the sequence of original frames. The second column C2 consists of those index frames numbered "2", "7", "12", "17" and "22" in the sequence of original frames. The third column C3 consists of those index frames numbered "3", "8", "13", "18" and "23" in the sequence of original frames. The fourth column C4 consists of those index frames numbered "4", "19", "14", "19" and "24" in the sequence of original frames. The fifth column C5 consists of those index frames numbered "5", "10", "15", "20" and "25".

As shown in FIG. 5, the mask positioning mechanism 57 is constituted of a bearing 87, a mask holder 88 and shift mechanism 89 for shifting the mask holder 88 a little in a crosswise direction of the paper mask 51 or 52. The bearing 87 is a protuberance disposed at an innermost center portion of the mask guide plate 55 between the guide grooves 55a. A semi-circular notch 52d is formed in a center of a leading end of the second paper mask 52 in the mask inserting direction into the mask guide plate 55, such that the notch 52d is rotatably fitted to the periphery of the bearing 87 when the second paper mask 52 is fully inserted into the guide grooves 55a. Thus, the bearing 87 doubles as a stopper for positioning the second paper mask 52 in the masking position.

As shown in FIG. 8A, the mask holder 88 has a pair of roller bearings 88a which come into contact with side edges of the second paper mask 52 when the second paper mask 52 is fully inserted into the guide grooves 55a, as shown in FIG. 5. Thereby the second paper mask 52 is held between the roller bearings 88a so as to be able to incline in the crosswise direction to the mask inserting direction into the masking position.

The shift mechanism 89 consist of a shift frame 90 which holds the mask holder 88 to be slidable therein, and an eccentric cam 91. The shift frame 90 has a pair of guide slots 92 extending in a lengthwise direction of the shift frame 90, that is, the crosswise direction to the mask inserting direction into the mask guide plate 55. A pair of guide rollers 93 protruding from the mask holder 88 are engaged in the guide slots 92 so as to be slidable along the guide slots 92. Thus, the mask holder 88 can slide along the guide slots 92 within the shift frame 90. The eccentric cam 91 is mounted rotatably to the mask holder 88. The shift frame 90 also has a slot 94 in a center portion thereof for engagement with the eccentric cam 91. The slot 94 is elongated in a lateral direction of the shift frame 90, so that the eccentric cam 91 is rotatable in the slot 94.

In response to the rotation of the eccentric cam 91, the mask holder 88 is slightly shifted along the guide slots 92, i.e. in the crosswise direction of the paper mask 52, as shown in FIG. 8B. Since the trailing portion of the paper mask 52 is held between the roller bearings 88a, the paper mask 52 can slightly pivot on the bearing 87 as the mask holder 88 is shifted. In place of the roller bearings 88a, cylindrical, ring-like or semi-circular projections may be used for holding the trailing portion of the paper mask 52 so as to allow the paper mask 52 to pivot about the bearing 87 by shifting the mask holder 88.

Since the width W2 of the second paper mask 52 is slightly less than the internal width W1 of the mask guide plate 55, the second paper mask 52 can slightly rotate about the pivot 87 when the mask holder 88 is shifted within the shift frame 90. As a result of slight rotation about the pivot 87, the inclination of the paper mask 52 and hence the mask aperture 52a is finely adjusted within the mask guide plate 55. After the paper mask 52 is properly positioned, the eccentric cam 91 is fixed by a not-shown screw to secure the position of the mask holder 88 in the shift frame 90. It is alternatively possible to provide an eccentric cam on the shift frame 90, and a slot for this cam in the mask holder 88.

Figure 9A:
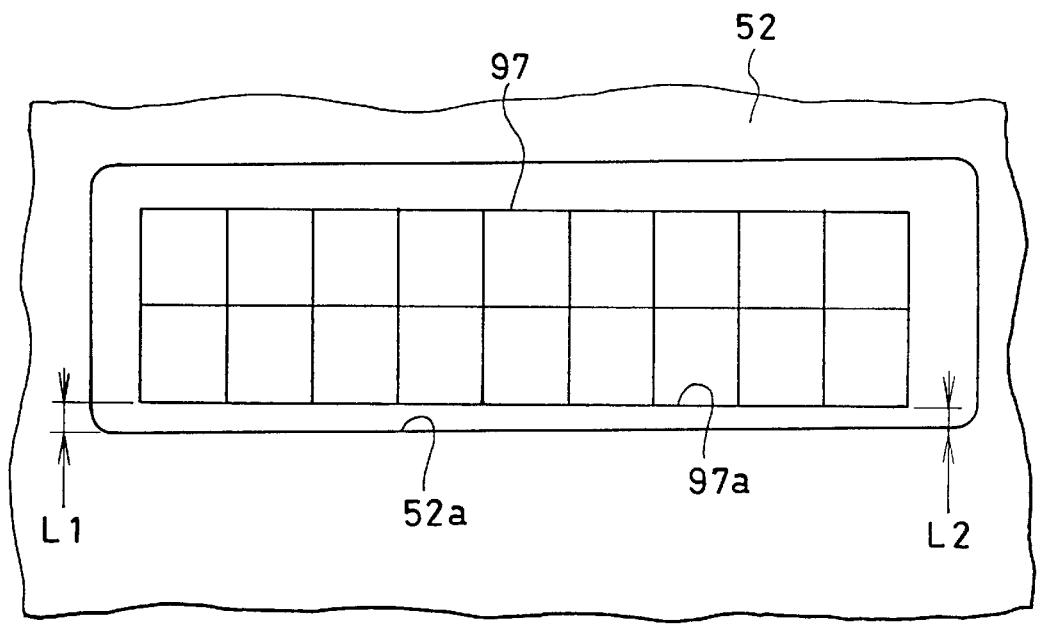
FIGS. 9A and 9B are diagrams illustrating image positions of a test chart formed through a mask aperture in a tilt position and a corrected position, respectively.
Figure 9B:
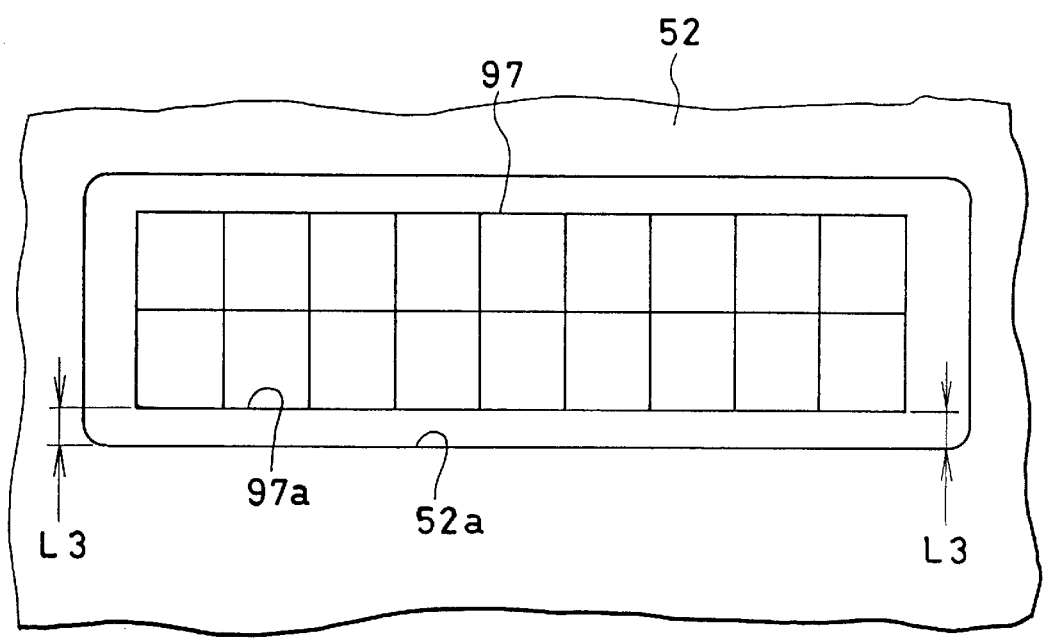

To adjust the inclination of the mask aperture 52a to the optical image formed through the printing lens 82, the index image exposure section 17 first projects an image of a lattice pattern 97 as reference lines toward the paper mask device 16, as shown in FIGS. 9A and 9B. FIG. 9A shows an example of lattice image 97 formed on the photo paper 12 through the mask aperture 52a before being adjusted. When the mask aperture 52a tilts, distance from a bottom line 97a of the lattice image 97 to a bottom rim of the mask aperture 52a in the drawings changes from L1 to L2. Then, the inclination of the paper mask 52 is adjusted by rotating the eccentric cam 91, so as to make the bottom line 97a parallel to the bottom rim of the mask aperture 52a. FIG. 9B shows the lattice image 97 and the mask aperture 52 after being adjusted, wherein the distance between the bottom line 97a and the bottom rim of the mask aperture 52a is maintained in a constant value L3.

The lattice image 97 may be focused on a facing surface of the paper mask 52, instead of being focused on the photo emulsion surface of the photo paper 12. In that case, the lattice image 97 is so magnified that four sides or margins of the lattice image 97 are formed around the mask aperture 52a, and then the inclination of the paper mask 52 is adjusted so as to make the lines of the lattice image 97 parallel to or rectangular to the rims of the mask aperture 52a. It is also possible to observe the lattice image 97 as printed after developing the photo paper 12, and adjusts the inclination of the paper mask 52 based on the printed lattice image 97.

On the other hand, when the first paper mask is set in the paper mask device 16, because the first paper mask 51 has substantially the same width W1 as the internal width W1 of the mask guide plate 55, the first paper mask 51 is held securely between the guide grooves 55a, and the bearings 88a do not come into contact with the side edges of the first paper mask 51. That is, the mask positioning mechanism 57 does not act on the first paper mask 51. This is because a slight inclination of the mask aperture 51a and thus merged characters is not so conspicuous that it is unnecessary to make such a fine adjustment of the inclination as required for the mask aperture 52a. Of course, it is possible to use a paper mask for the merge printing whose inclination angle within the mask guide plate 55 is adjustable in the same way as the second paper mask 52.

The operation of the printer-processor 10 will be described. For the ordinary printing, the original frames on the filmstrip 42 are placed one by one in the printing position by the film carrier 42, and the not-shown film scanner detects three color densities of the frame in the printing position. Based on the three color densities, the controller 45 calculates LATD values and characteristic values of each frame, and determines three color exposure amounts based on these values in a conventional manner. Based on the three color exposure amounts, the controller 45 determines insertion amounts of the respective color filters 38 to 40, and an exposure time.

The light controller 36 sets the color filters 38 to 40 in correspondence with the determined insertion amounts, and the shutter driver 33 opens the shutter 43 for the exposure time. In this way, each frame is printed as a latent image on the photo paper 12. The exposed portion of the photo paper 12 is temporarily stored in form of a loop in the second paper reservoir 27, and then developed in the paper processor 28. The second paper reservoir 27 is to absorb a difference in paper feeding speed between the stepwise feeding through the exposure sections 17 and 22, and continuous feeding through the paper processor 28.

The developed photo paper 12 is cut into individual printed frames with reference to conventional cut marks, and the printed frames are grouped by their original filmstrips with reference to conventional sort marks. The image data obtained from the three color densities of each original frame is stored in the memory 46. Composed image data for displaying index frames in a given format is produced from the image data and stored in the memory 46.

Figure 10:
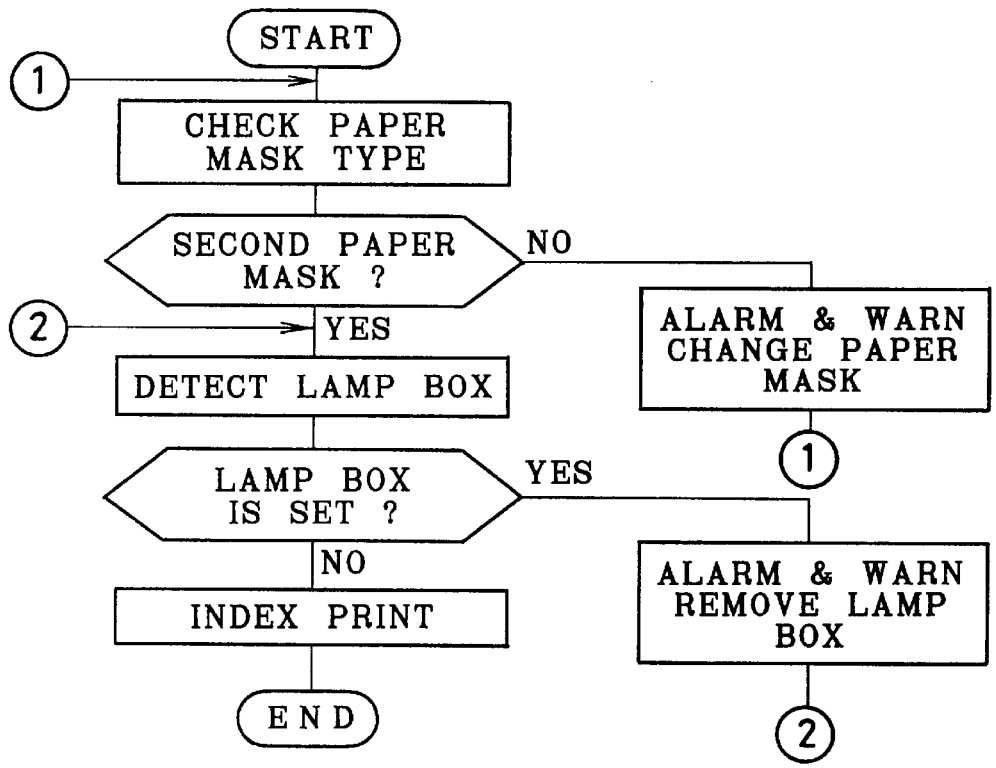
FIG. 10 is a flow chart illustrating an operation sequence of index-printing.

When making an index print, the operator switches the printer-processor to an index printing mode, and sets the second paper mask 52 in the paper mask device 16. In the index printing mode, the controller 45 first monitors the mask type sensor 60, as shown in FIG. 10. If the mask type sensor 60 detects the first paper mask 51 in the index printing mode, the controller 45 gives an alarm and a warning signal, so the operator can correctly set the second paper mask 52 in the paper mask device 16.

As the second paper mask 52 is inserted into the paper mask device 16, the notch 52d of the paper mask 52 comes into contact with the pivot 87, whereby the paper mask 52 is stopped to be positioned in the lengthwise or inserting direction. Next, the index image exposure section 17 projects the lattice image 97 toward the paper mask 52, so that the operator observes if the lines of the lattice image 97 are parallel to the bottom and top margins of the mask aperture 52a. If not, the operator actuates the shift mechanism 89 to rotate the eccentric cam 91 in one direction by an appropriate angle so as to shift the mask holder 88 to correct the inclination of the mask aperture 52a.

Thereafter, the controller 45 checks if the lamp box 53 is set in the subsidiary printing station 15. Since the lamp box 53 is connected to the power source through the connectors 71 and 72 in the printing station 15, the controller 45 can detect from a change in resistance that the lamp box 53 is set in the subsidiary printing station 15. It is alternatively possible to provide a micro switch or a photo-electric sensor for the detection of the lamp box 53.

If the lamp box 53 is set in the subsidiary printing station 15 in the index printing mode, the controller 45 gives an alarm and a warning signal, so the operator can remove the lamp box 53 from the paper mask device 16. To remove the lamp box 53, the operator opens a not-shown lid of the printer-processor 10 to grip the handle 64 of the lamp box 53 and draw it out from the lamp box guide frame 58. When to remove the lamp box 53 from the paper mask device 16, the photo paper 12 is fed backward to be retracted from the paper mask device 16 and stored in the first paper reservoir 13, so that the photo paper 12 will not be exposed to ambient light that will enter through the opened lid. Instead of retracting the photo paper 12 from the paper mask device 16, it is possible to provide a blind plate or the like in the paper mask device 16 to shield the photo paper 12 from the ambient light while the lid is opened.

The index image exposure section 17 first displays data including the ID number 102, the ID number bar code 103 and the title 104 of the index print 100 on the LCD panel 81, so that the data is printed in the data column 101 of the index print 100. Thereafter, the photo paper 12 is advanced by one step corresponding to one column, so that the data column is removed from the mask aperture 52a, and a first column exposure range is positioned behind the mask aperture 52a. Then, five index frames 4 of the first column C1 are displayed on the LCD panel 81, and are printed in the first column exposure range. In the same way, index frames 4 of the second and following columns C2 to C5 are printed column by column while the photo paper 12 is advanced step by step.

The index print 100 may be made following the series of print frames made from the same filmstrip 42, or it is possible to make a number of index prints 100 in succession after the corresponding filmstrips 42 are subjected to printing in the main printing station 20.

Figure 11:
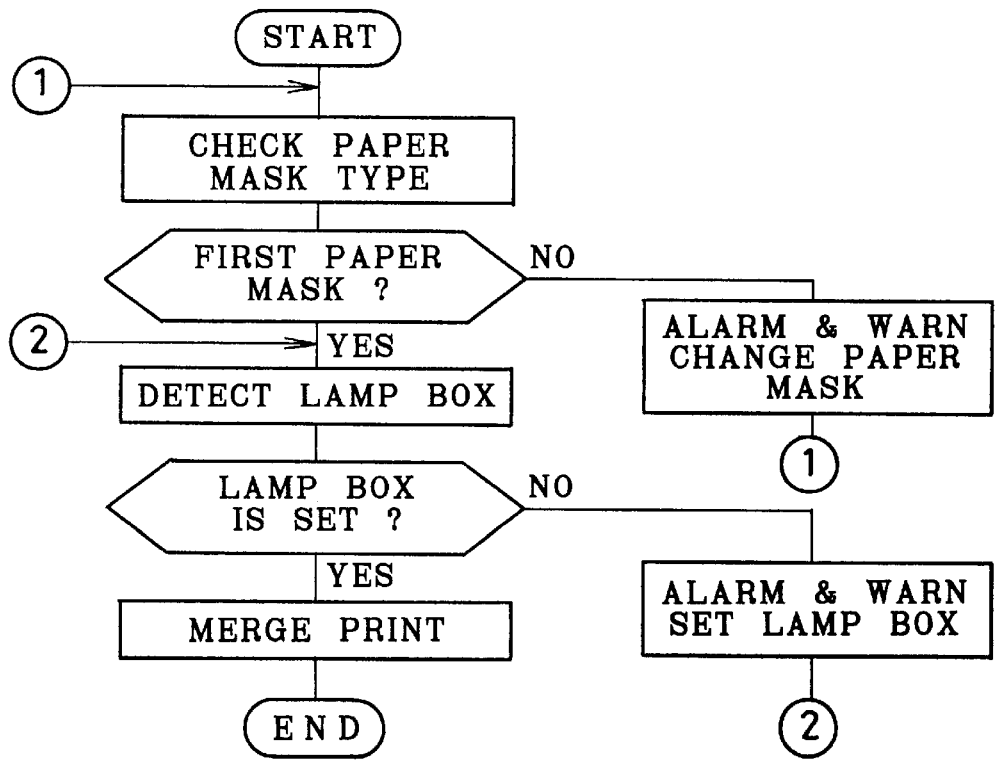
FIG. 11 is a flow chart illustrating an operation sequence of merge-printing.

When making greeting cards, the operator switches the printer-processor to a merge printing mode, and the first paper mask 51 should be set in the paper mask device 16. As shown in FIGS. 3 and 6, the lith film 59 is attached to the mask aperture 51a of the first paper mask 51. The lith film 59 is previously lettered with greetings such as "Merry Xmas". In the merge printing mode, the controller 45 first monitors the mask type sensor 60, as shown in FIG. 11. If the mask type sensor 60 does not detects the first paper mask 51 in the merge printing mode, the controller 45 gives an alarm and a warning signal, so the operator can correctly set the first paper mask 51 in the paper mask device 16.

As the first paper mask 51 is inserted into the paper mask device 16, the protrusion 61 of the first paper mask 51 comes into contact with the mask type sensor 60, whereby the mask type sensor 60 generates the detection signal to indicate that the first paper mask 51 is fully inserted into the mask guide plate 55a.

Thereafter, the controller 45 checks if the lamp box 53 is set in the subsidiary printing station 15. If the lamp box 53 is not set in the subsidiary printing station 15 in the merge printing mode, the controller 45 gives an alarm and a warning signal, so the operator can set the lamp box 53 in the paper mask device 16. To set the lamp box 53, the operator opens the not-shown lid of the printer-processor 10 and pushes the lamp box 53 into the lamp box guide frame 58 while gripping at the handle 64. When setting the lamp box 53 into the paper mask device 16, the photo paper 12 is fed backward to be retracted from the paper mask device 16 and stored in the first paper reservoir 13, so that the photo paper 12 will not be exposed to ambient light. Since the lamp box 53 is connected to the power source through the connector 71 in the printing station 15, the controller 45 can detect from a change in resistance that the lamp box 53 is set in the subsidiary printing station 15.

Thereafter, the lamps 66 project light for a given time, so that the image of the letter of greetings is printed on the photo paper 12. The photo paper 12 is advanced toward the main printing station 20 by a given amount to position the next unexposed print frame of the photo paper 12 in the subsidiary printing station 15. In this way, the merge-printing is carried out a designated number of times.

In the main printing station 20, an image of a designated original frame on the filmstrip 42 is superimposed on each of the designated number of print frames with the greeting letter. The exposed portion of the photo paper 12 is developed in the paper processor 28, and is cut into individual greeting cards.

As described so far, the paper mask device 16 can hold the first paper mask 51 and the lamp box 53 for the merge printing, or the second paper mask 52 for the index printing, so that the printer-processor 10 can conduct either of the index printing and the merge printing in the same printing station without the need for a large installation space.

Since there is the mask positioning mechanism 57, if the mask aperture 52a of the second paper mask 52 is cocked relative to the projected image on the photo paper 12, the position of the second paper mask 52 can be corrected with ease. Therefore, the columns or lines of the index print is oriented parallel to each other and to the side edges of the photo paper 12. That is, the margins or blanks around the index frames are not cut slantwise.

Although the above embodiment has been described with reference to the examples shown the drawings, the number of index frames 4 contained in one index print is changeable according to the number of original frames recorded on the corresponding filmstrip 42. When changing the number of index frames, the number of columns and/or the number of rows may change.

The first paper mask 51 for the merge printing can be attached with a variety of lith films including those which are directed to printing the letter in a portion outside the photographic image, instead of superimposing the letter on the photographic image.

Figure 12:
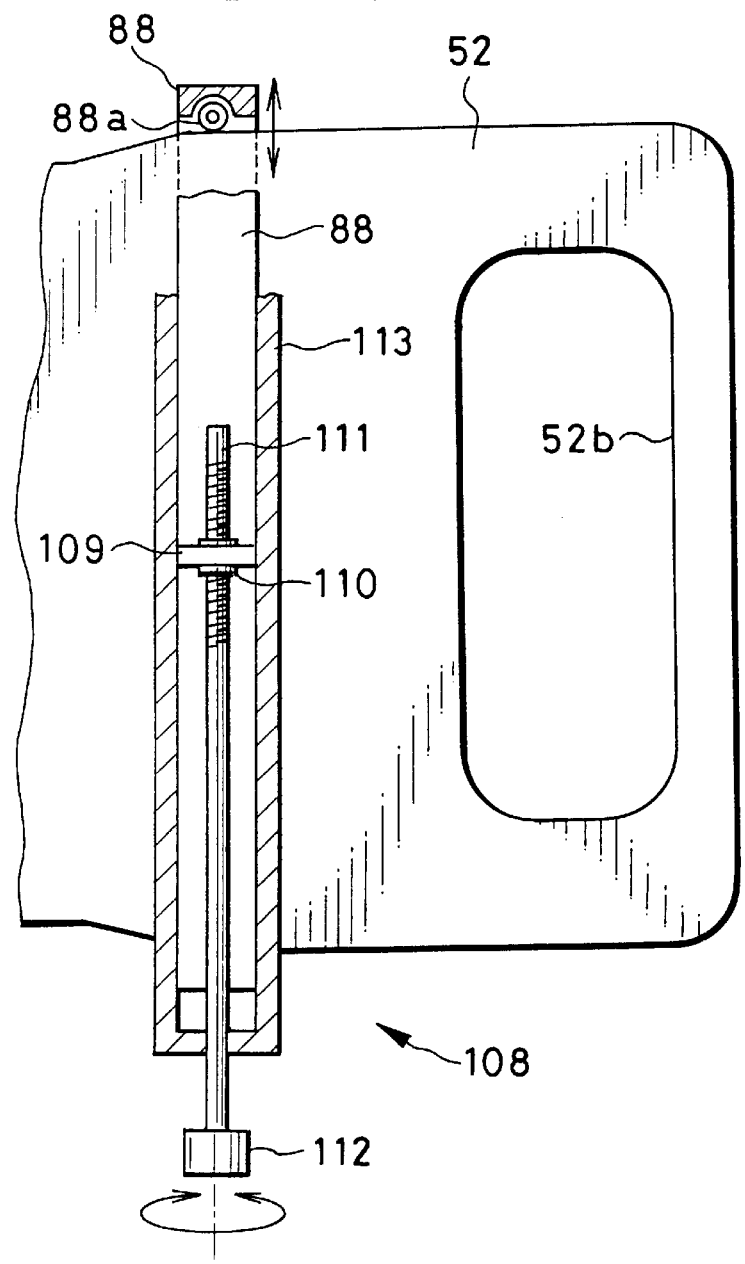
FIG. 12 is an explanatory view of another embodiment of mask positioning mechanism for the paper mask device.

In the above embodiment, the mask holder 88 is shifted through the shift mechanism 89 by rotating the eccentric cam 91. It is alternatively possible to shift the mask holder 88 through a shift mechanism 108 as shown in FIG. 12, wherein the mask holder 88 is provided with a bracket 109 having a female screw 110. A lead screw 111 is coupled to the female screw 110 such that the mask holder 88 is shifted along a guide frame 113 by rotating the lead screw 111 through a dial member 112. It is also possible to use a link mechanism for shifting the mask holder 88.

Figure 13:
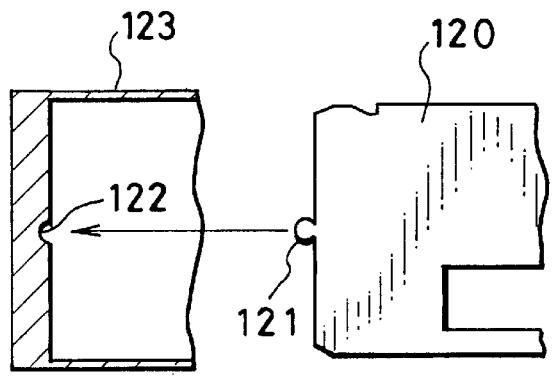
FIG. 13 is an explanatory view of another embodiment of paper mask device.
Figure 14:
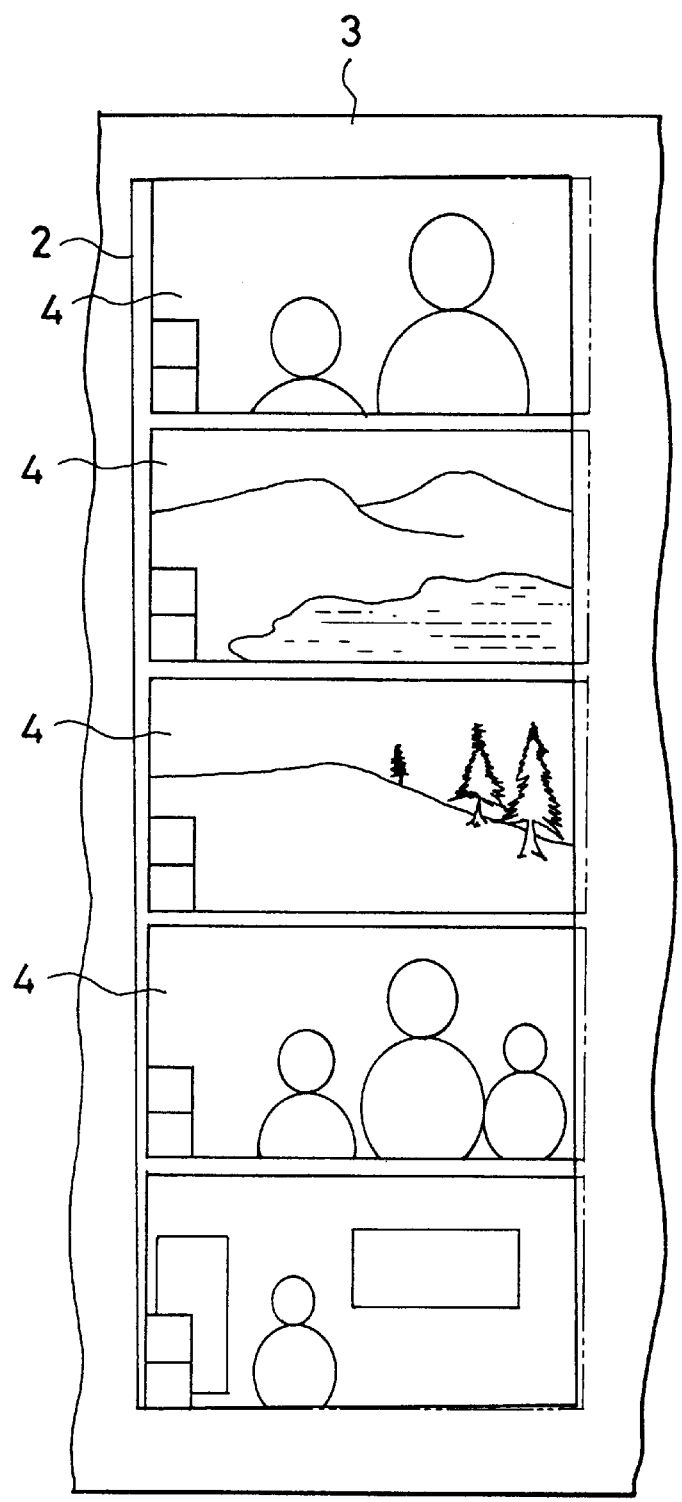
FIG. 14 is a diagram for explaining a conventional problem in index-printing.

The above described embodiment uses a bearing as the pivot 87 for the second paper mask 52, but the pivot 87 may be a protuberance having a semi-circular section. According to another embodiment shown in FIG. 13, a paper mask 120 is provided with a semi-circular protuberance 121 at a center of its leading end, while a mask guide plate 123 is provided with a semi-circular recess 122 to accept the protuberance 121 such that the paper mask 120 is pivotal about the protuberance 121 in a plane horizontal to the paper mask 120, within the mask guide plate 123.

The present invention is applicable not only to the printer-processor 10, but also to any type of photo printer. The subsidiary printing station may be disposed in a downstream portion of the main printing station.

Thus, the present invention should not be limited to the above described embodiments but, on the contrary, various modification may be possible to those skilled in the art without departing from the scope of claims attached hereto.

What is claimed is:

1. A paper mask device for use in a photo printer comprising:

a first paper mask having a mask aperture to which a lith film with appropriate lettering is attached, the first paper mask being used for merge-printing the lettering with a pictorial image in a photo print;

a second paper mask having a mask aperture for making an index print composed of a plurality of index frames corresponding to a series of original frames recorded on one filmstrip;

a mask guiding and holding means for guiding one of the first and second paper masks either one of into and out of a masking position for masking photo paper, and holding the one paper mask in the masking position;

a lamp box for illuminating the lith film attached to the mask aperture of the first paper mask when the first paper mask is placed in the masking position; and a lamp box guiding and holding means for guiding the lamp box either one of into and out of a position for illuminating the lith film of the first paper mask as placed in the masking position, and holding the lamp box in the illuminating position.

2. A photo printer comprising:

a paper feeding means for feeding a web of photo paper from a roll through a paper transport path;

a main printing station disposed in the paper transport path for printing an image on the photo paper from one original frame recorded on photo film;

a subsidiary printing station disposed either one of before and behind the main printing station in the paper transport path;

a first paper mask having a mask aperture to which a lith film with appropriate lettering is attached, the first paper mask being used for merge-printing the lettering with the image of the original frame into a photo print, said lettering being printed at said subsidiary printing station and said image of said original frame being printed at said main printing station;

a second paper mask having a mask aperture for printing an index image composed of a plurality of index frames onto the photo paper;

a mask guiding and holding means for guiding one of the first and second paper masks either one of into and out of a masking position for masking photo paper at the subsidiary station, and holding the one paper mask in the masking position;

a lamp box for illuminating the lith film attached to the mask aperture of the first paper mask when the first paper mask is placed in the masking position; and a lamp box guiding and holding means for guiding the lamp box either one of into and out of a position for illuminating the lith film of the first paper mask as placed in the masking position, and holding the lamp box in the illuminating position; and an index image exposure means for projecting a composed image of the index frames onto the photo paper through the mask aperture of the second paper mask as being placed in the masking position, the index image exposure means being allowed to project the composed image while the lamp box is retracted from the illuminating position.

3. A photo printer as claimed in claim 2, wherein the mask guiding and holding means comprises a paper mask guide member for guiding the one of the paper masks either one of into and out of the masking position in a crosswise direction to the web of photo paper, and the lamp box guiding and holding means comprises a lamp box guide member for guiding the lamp box either one of into and out of the illuminating position in the crosswise direction to the web of photo paper.

4. A photo printer as claimed in claim 2 or 3, further comprising:

an identification member provided in at least one of the first and second paper masks for allowing the photo printer to identify either one of the first and the second paper mask;

a mask type detection means provided in the mask guiding and holding means for detecting the identification member when one of the first and second paper masks is placed in the masking position;

a lamp box detection means for detecting if the lamp box is placed in the illuminating position; and an alarming means for giving an alarm when the lamp box is in the illuminating position while the second paper mask is placed in the masking position.

5. A paper mask device for use in a photo printer comprising:

at least a paper mask having a mask aperture;

a mask guiding means for guiding the paper either one of into and out of a masking position for masking photo paper;

a pivot member formed at a center of a leading end of the paper mask in a mask inserting direction into the masking position;

a bearing member formed in the mask guiding means, for bearing the pivot member of the paper mask in the masking position so as to be pivotal thereon in a plane horizontal to the paper mask; and a mask shifting means holding a trailing end portion of the paper mask in the masking position and shifting the paper mask so as to pivot about the pivot member.

6. A paper mask device as claimed in claim 5, wherein the mask shifting means comprises a mask holder which holds the paper mask at opposite side edges of the trailing end portion in the masking position, a guide frame for supporting the mask holder to be movable in a crosswise direction to the mask inserting direction, and a shift mechanism for shifting the mask holder in the crosswise direction.

7. A paper mask device as claimed in claim 6, wherein the mask holder comprises a pair of rollers for guiding and bearing the opposite side edges of the paper mask so as to be able to incline in the crosswise direction.

8. A paper mask device as claimed in claim 7, wherein the shift mechanism comprises an eccentric cam rotatably engaged in a slot elongated in the mask inserting direction, the eccentric cam being rotated to shift the mask holder.

9. A paper mask device as claimed in claim 7, wherein the shift mechanism comprises a lead screw extending in the crosswise direction, the lead screw being rotated to shift the mask holder.

10. A paper mask device as claimed in claim 5, further comprising a means for projecting an image of reference lines onto the photo paper through the mask aperture of the paper mask in the masking position, for reference in correcting inclination of the mask aperture.

11. A paper mask device as claimed in claim 10, wherein the image of reference lines is constructed of a lattice image.

12. A paper mask device as claimed in claim 5, wherein the paper mask includes a first paper mask having a mask aperture to which a lith film with appropriate lettering is attached, the first paper mask being used for merge-printing the lettering with a pictorial image in a photo print, and a second paper mask having a mask aperture for making an index print composed of a plurality of index frames corresponding to a series of original frames recorded on one filmstrip; and wherein the paper mask device further comprises a lamp box for illuminating the lith film attached to the mask aperture of the first paper mask when the first paper mask is placed in the masking position; and a lamp box guiding and holding means for guiding the lamp box into or out of a position for illuminating the lith film of the first paper mask as placed in the masking position, and holding the lamp box in the illuminating position.

13. A photo printer comprising:

a paper feeding means for feeding a web of photo paper from a roll through a paper transport path;

a main printing station disposed in the paper transport path for printing an image on the photo paper from one original frame recorded on photo film;

a subsidiary printing station disposed one of before and behind the main printing station in the paper transport path;

a first paper mask having a mask aperture to which a lith film with appropriate lettering is attached, the first paper mask being used for merge-printing the lettering with the image of the original frame into a photo print;

a second paper mask having a mask aperture for printing an index image composed of a plurality of index frames onto the photo paper;

a mask guiding and holding means for guiding one of the first and second paper masks one of into and out of a masking position for masking photo paper, and holding the one paper mask in the masking position;

a lamp box for illuminating the lith film attached to the mask aperture of the first paper mask when the first paper mask is placed in the masking position; and a lamp box guiding and holding means for guiding the lamp box one of into and out of a position for illuminating the lith film of the first paper mask as placed in the masking position, and holding the lamp box in the illuminating position;

an index image exposure means for projecting a composed image of the index frames onto the photo paper through the mask aperture of the second paper mask as being placed in the masking position, the index image exposure means being allowed to project the composed image while the lamp box is retracted from the illuminating position;

an identification member provided in at least one of the first and second paper masks for allowing the photo printer to identify either one of the first and the second paper masks;

a mask type detection means provided in the mask guiding and holding means for detecting the identification member when one of the first and second paper masks is placed in the masking position;

a lamp box detection means for detecting if the lamp box is placed in the illuminating position; and an alarming means for giving an alarm when the lamp box is in the illuminating position while the second paper mask is placed in the masking position.

14. A paper mask device for use in a photo printer, comprising:

at least a paper mask having a mask aperture;

a mask guiding means for slidably guiding the paper mask either one of into and out of a masking position for masking photo paper;

a pivot member formed at a center of a leading end of the paper mask in a mask inserting direction into the masking position;

a bearing member formed in the mask guiding means, for bearing the pivot member of the paper mask in the masking position so as to be pivotal thereon in a plane horizontal to the paper mask; and a mask shifting means holding a trailing end portion of the paper mask in the masking position and shifting the paper mask so as to pivot about the pivot member.

* * * * *